Aug. 26, 1941.    N. H. RAHE    2,253,580
SAFETY VALVE DEVICE FOR FLUID BRAKE SYSTEMS
Filed May 7, 1940
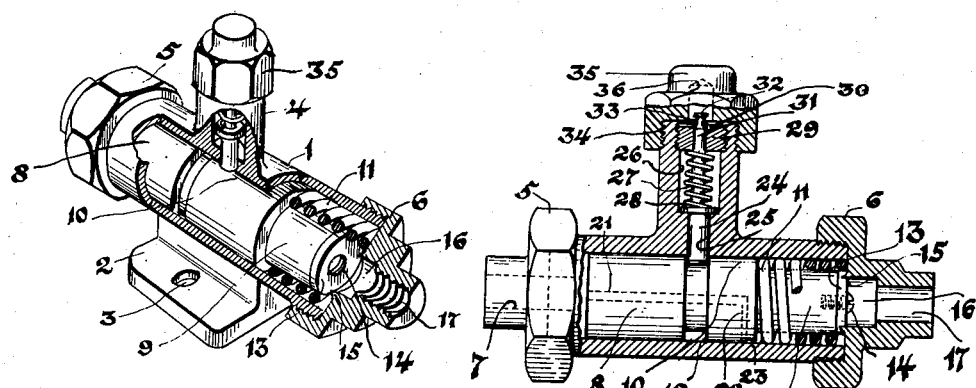
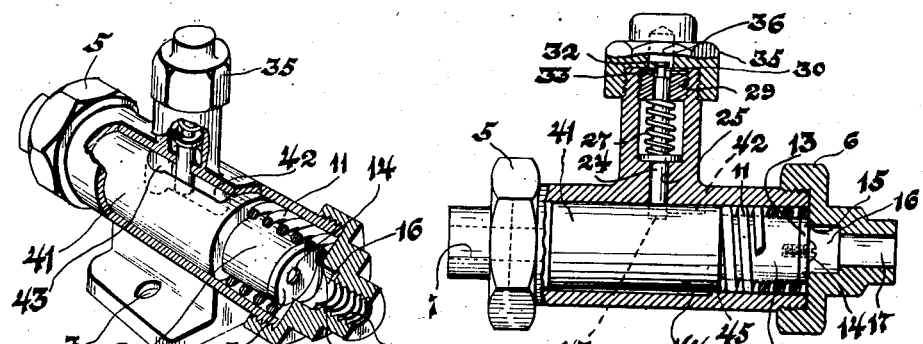
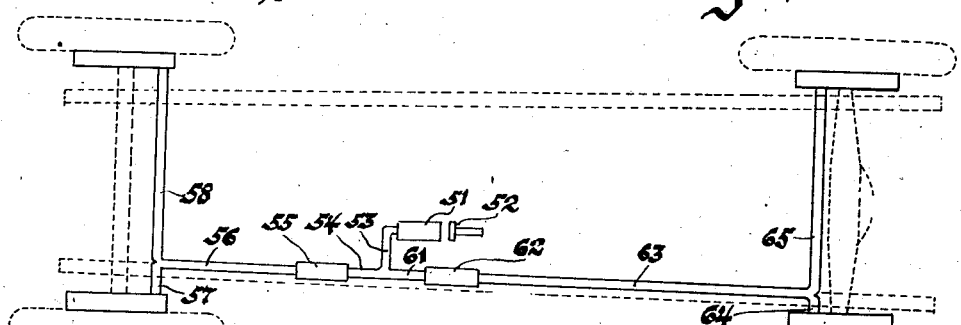
INVENTOR.
BY Norman H. Rahe,
Saywell & Wesseler,
ATTORNEYS.

Patented Aug. 26, 1941

2,253,580

UNITED STATES PATENT OFFICE 2,253,580

SAFETY VALVE DEVICE FOR FLUID BRAKE SYSTEMS

Norman H. Rahe, Cleveland, Ohio

Application May 7, 1940, Serial No. 333,769

2 Claims. (Cl. 303—84)

This invention, as indicated, relates to a safety valve device for fluid brake systems. More particularly, it comprises means adapted to be interposed in the transmission line of a fluid brake system, and adapted to effectively cut off fluid pressure connection with a portion of said system in the event of leakage which would otherwise unbalance or destroy the effectiveness of the system as a whole. In safety brake systems, particularly the hydraulic brakes in use on automobiles, the entire system functions as a unit, and if a leak should develop in a fluid pressure line adjacent one of the wheels it may result in the entire brake system failing to act in an emergency. Even though the leak is relatively small the effectiveness of the brake system may be reduced so that adequate braking force cannot be applied and thus cause accidents. The present invention provides means to be applied to the pressure line leading to the brakes on the wheels of an automobile so that in the event a leak develops the act of applying fluid pressure through the brake pedal will seal the leaking part of the pressure line system and permit the application of full pressure to the remaining portion of such system. The safety valve device may be applied to each single brake, but preferably is applied to the pressure line leading to the front wheels and rear wheels as pairs of braking elements in order to prevent the unbalancing of the braking system, as would take place if the brake were released on one front wheel or one rear wheel.

The principal object of the present invention is to provide an improved safety valve device for a fluid brake system which is simple in construction and dependable in operation.

Another object of the invention is to provide a safety valve device to serve as a cut-off in a safety pressure line upon the loss of pressure on the opposite side of said line, such valve device floating in the pressure line.

Another object of the invention is to provide a safety valve device which may be readily inserted in fluid pressure brake systems now in use with a minimum of effort and with perfect performance after installation.

Another object of the invention is to provide a safety valve unit formed of few parts which may be readily assembled, and wherein the elements are so positioned that the safety action occurs with a minimum of movement of the parts and wherein the sealing action is secure and permanent.

A further object of the invention is to provide a safety valve device comprising a main body portion wherein a plunger moves over a restricted path in the normal operation of the fluid pressure system, but wherein such plunger moves to sealing position upon the failure of a portion of the braking system, and is maintained in such sealing position by a locking device normally riding in pressure relation upon such floating plunger and moving to locking position in a straight single directional movement upon the safety device moving to sealing position.

Other and further objects of the invention will appear in the course of the following description.

To the accomplishment of the foregoing and related ends, said invention, then, consists of the means hereinafter fully described and particularly pointed out in the claims, the annexed drawing and the following description setting forth in detail certain mechanism embodying the invention, such disclosed means constituting, however, but several of various forms in which the principle of the invention may be used.

In said annexed drawing:

Fig. 1 is a perspective view of a safety valve unit, broken away in part, embodying the principles of the invention, such unit being shown in operative unsealed position;

Fig. 2 is a central vertical sectional view taken longitudinally of the structure shown in Fig. 1, and illustrating such device in closed or sealing position;

Fig. 3 is a view similar to Fig. 1 showing a modified form of construction embodying the principles of the invention;

Fig. 4 is a central vertical sectional view taken longitudinally of the structure shown in Fig. 3 and illustrating such device in closed or sealing position; and Fig. 5 is a diagrammatic plan view showing the position of the safety devices embodying the principles of the invention as applied to the hydraulic brake system of an automobile.

As is clearly shown in Figs. 1 and 2 of the drawing the safety device comprises a body member 1, preferably in the form of a casting having an integral base member 2 provided with one or more bolt holes 3 by means of which it may be attached to a suitable point of support. The body member is preferably cylindrical in cross section, and has a cylindrical extension 4 at one side thereof, preferably opposite the base member, and providing a housing for the locking pin and its associated mechanism, as will be presently described. The cylindrical body member is preferably closed by means of cap members 5, 6, the cap member 5 having a central passageway 7 by means of which it may be connected with a fluid pressure transmission line. The cap also permits the free withdrawal from the cylindrical body member of the plunger or piston 8 which is of a length somewhat less than the full length of the cylindrical body member so as to permit a range of operative movements of said piston during the normal operation of the fluid braking system with no leaks or the like in the line. The plunger, it will be noted, is of full diameter over the major portion of its cylindrical extent, but has a reduced forward end 9 around which a spring 11 may be engaged to normally maintain the plunger in spaced relation to the valve seat, as will be presently described. At an intermediate point of the enlarged portion of the plunger an annular recess 12 is provided, such recess being of a width to receive a locking pin when the plunger moves to sealing position, as will be presently described. The enlarged portion 10 of the plunger intermediate the recess 12 and the reduced portion 9 provides a slideway and locking pin retaining surface, as will appear hereinafter. At the forward reduced end the plunger carries a disk-shaped sealing member 13, which preferably is a synthetic rubber-like element not subject to deterioration when immersed in oil and similar fluids. The valve sealing member 13 may be held in position by means of a set-screw 14 engaged in an axial screw-threaded recess formed centrally of the reduced end of the piston. The sealing member of the piston is normally held in spaced relation to the seat 15 in the form of an annular inwardly projecting lip provided adjacent an enlarged recess 16 forming part of the central passageway 17. This provides for free action of the piston member in the movement of the sealing member 13 into fluid-tight relation with the projecting annular lip of the valve seat 15.

The central passageway 17 provides for connection to a suitable pressure line at such point. Such pressure line in a hydraulic brake system wherein this device is applied leads to the front or rear pair of wheels, depending upon the point of insertion of the safety valve device.

The piston member is provided with a by-pass opening 21 extending axially through the same to a point closely adjacent the reduced portion thereof, and at such point communicating with a radial passageway 22, the outer end of which opens through the enlarged portion of the piston adjacent its reduced area. A shallow recess 23 is provided on the surface at said enlarged portion, such recess extending longitudinally to the adjacent edge of the enlargement so as to provide a path of communication through the piston to the valve end of the cylindrical body member at the position where the spring is engaged about the reduced end of said piston. The by-pass is a very small passageway through the piston and is intended to provide for the equalization of pressure on each side of the piston during the idle periods of the braking system. When pressure is applied to the braking system, as has been indicated, the piston moves from the pressure receiving end of the body member toward the pressure transmitting end thereof, but such range of movement is relatively slight, and in no case exceeds the normal travel distance provided on the surface of the enlargement 10 intermediate the valve recess 12 and the reduced portion of the piston 9.

During the range of movement of the piston referred to above the locking pin 24 will ride freely against the surface 10 of the enlargement heretofore referred to. The locking pin, it will be noted, is slidingly engaged within the cylindrical passageway 25 in the cylindrical extension 4, heretofore referred to. The passageway 25 communicates with an enlarged recess 26 within which a spring 27 is engaged, said spring bearing at one end against a shoulder 28 provided on the locking pin in spaced relation to its lower end, and said spring bearing on its opposite end against an apertured spring abutment 29 screw-threadedly engaged in the upper screw-threaded portions of the extension. The spring thus serves to normally apply downward pressure to the locking pin. The upper portion 31 of the locking pin is of reduced cross-section, and its extreme upper end 32 normally projects slightly above the abutment 29 and is formed with a shallow recess 33 adjacent thereto so as to provide a permanent enlargement on the stem whereby the locking pin may be withdrawn from locking engagement with the recess in the plunger when it is desired to release the safety valve plunger from its sealing position after the repair of the fluid brake system. The spring abutment 29 may be adjusted to any desired position of tension on the spring by means of a spanner wrench engaged with the radial notches 30 on the upper face of said abutment. The lateral extension 4 of the body member is provided with external screw threads 34 adjacent its outer end upon which a cap member 35 is screw-threadedly engaged, such cap member having a central recess 36 to permit free non-binding sliding movement of the locking pin.

The modified form of construction shown in Figs. 3 and 4 of the drawing has substantially the same arrangement of cylindrical body member, and caps, and the cylindrical extension and its mechanism are substantially identical with what is disclosed in Figs. 1 and 2, and similar reference characters have been applied to identical parts. It will be noted, however, that the piston 41 differs from the piston 8 heretofore described in that it has on the upper side a longitudinal recess 42 having at its end toward the inlet end of the cylinder a deeper depression 43. The locking pin 24 during the normal operation of the piston rides in the longitudinal recess 42 which is of a length adequate to permit free floating action of the piston during the braking operation under all conditions. When the pressure at the output end of the cylinder drops through leakage or the like and endangers application of suitable braking pressure the floating piston will move to the extreme end of the cylinder and bring the sealing member 13 into liquid-tight contact with the seat 15, and simultaneously the pin 24 will drop into the locking recess 43.

The piston 41 is not provided with a central passageway to form a by-pass for equalized pressure on opposite sides of the braking system when the device is in its normal inoperative condition. In the modified form the by-pass 44 is provided in the casting and comprises a channel-way cut into the lower side of the cylinder wall, preferably from the inlet side of the cylinder to a point 45 slightly short of a point of maximum travel when it moves to sealing position. By reason of this construction the floating cylinder when in sealing position will seal not only the liquid at the point of contact of the valve member 13 with the valve seat 15, but the enlarged portion of the piston adjacent its point of connection with the reduced portion thereof will serve as a sealing member for the by-pass. When the by-pass is thus cut off a degree of increased pressure will be produced, thus insuring the application of sufficient pressure to the end of the floating piston to engage the valve members permitting the locking pin to drop into the locking recess.

In the construction just described care must be observed in having the locking pin 24 engaged in the longitudinal recess 42 of the piston during the assembling of the device inasmuch as there is no annular channel around the piston to insure locking action irrespective of which surface of the piston is uppermost. In the form of device just described the provision of a by-pass on the lower side of the floating piston serves to supply at all times a certain amount of lubrication on the under surface of the piston and in this manner the free movement of the piston is insured at all times. In each of the forms of construction above set forth the locking pin 24 is maintained free of all direct connection with the fluid pressure system. It is housed in the lateral cylindrical housing 4, and the end of the locking pin at all times rides in pressure relation against a surface on the floating piston. The locking pin is under constant pressure and will ride into locking position the instant that sealing contact is made between the valve members upon the failure of the fluid pressure line at the end of the particular safety device brought into action.

The device in either of the forms above described is adapted for installation in various types of fluid pressure lines, and obviously the piston or plunger may be formed with a surface providing a long range of action, or a shorter range of action, depending upon the character of pressure within the fluid system to which it is applied. Likewise, the size and tension of the spring member used in connection with the plunger element, or the spring member used in conjunction with the locking pin may be varied as required for the special service for which the device is designed. When the device is to be applied to the hydraulic brake system of automobiles, the units are preferably so placed in the fluid brake system as to have one safety valve unit in the line communicating with the forward pair of wheels, and another safety valve unit in the line of communication with the rearward pair of wheels. This is illustrated diagrammatically in Fig. 5 wherein the master cylinder 51 of the fluid brake system is responsive to pressure upon the brake pedal 52, the pressure thus applied moving through the pressure line 53 and then dividing, a portion thereof being transmitted to the pressure line 54 leading to the forward safety valve unit 55, and thence through the passageway 56 and its branches 57 and 58 respectively to the front wheels. The other portion of the pressure from the line 43 is distributed through the pressure line 61 to the safety valve unit 62, and thence through passageway 63 to the branches 64 and 65 respectively to the rearward wheels.

The operation of the device will be obvious from the description of its construction. Thus when pressure is applied to the braking system the pressure applied to the enlarged end of the piston or plunger 8 will cause the same to move in a direction toward the output end of the safety unit and similar pressure will thus be applied to the passageway leading to the braking element on the wheels of the automobile. The range of movement of the plunger or piston will be relatively slight inasmuch as only slight movement is necessary in the braking element on the respective wheels to cause the same to engage in full braking relation. The length of surface 10 against which the locking pin 24 rides during the normal operation of the safety valve unit is of an extent sufficient to compensate for any wear which may at any time occur on any of the braking units. This insures the safety unit never being brought into action by reason of mere mechanical wear on the various parts of the braking system, but only to be brought into action when there is a leak of a character sufficient to destroy the safe braking of the vehicle in an emergency. The spring 11 is practically ineffective in resisting the fluid pressure applied to the plunger but has the important function of returning the plunger to its original position adjacent the receiving end of the safety valve unit. This provides for the proper volume of fluid between the reduced end of the plunger and the braking elements on the respective wheels.

When an emergency arises through the sudden development of a leak in one or more of the lines leading to the brake elements on the wheels the safety valve unit connected with that portion of the line will move not only its normal distance in the cylindrical chamber, but will move to full sealing position bringing the disk-like valve member 13 into sealing relation with the valve seat 15 and at the same time permitting the locking pin 24 to be forced into the annular recess 12 heretofore described, in the first form of construction or unit, or with the recess 43 in the second form of construction. When the brake line subject to the pressure loss is thus cut off the remaining portions of the brake system will act with full efficiency just as though such leak had not developed in any portion of the system. In this manner the vehicle will always be under full control even though a leak of serious proportion has developed in a part of the system. If the safety unit were not installed in such system the pressure drop would render the entire hydraulic braking systems ineffective. Under most conditions of traffic the failure of the braking system for even a brief moment will be the cause of an accident and gives insufficient time within which to reach for a safety mechanical brake for emergency purposes. It is absolutely necessary for the safety device itself to be so constructed that it is free of any features which would be subject to failure under emergency conditions.

It will be obvious that various changes in the specific types of structures may be used to provide a unit adapted for heavy commercial service and it may be found desirable to provide the cylinder with an integral end member and have a cap member only upon the opposite end thereof. Likewise the position of the supporting base may be varied with reference to the position of the locking pin housing, and other changes may be made in the interest of ease of construction or simplification of adjustment and installation. In installing devices of this type it is often found desirable to have air pressure relief openings so that the enclosure of trapped air in the system could be avoided. Accordingly one or more air relief passageways normally sealed with screw-threaded sealing elements may be provided on the body member of the cylinder for such use.

Other modes of applying the principle of my invention may be employed instead of those explained, change being made as regards the mechanism herein disclosed, provided the means stated by any of the following claims or the equivalent of such stated means be employed.

I therefore particularly point out and distinctly claim as my invention:

1. A safety device for fluid pressure systems which comprises a cylinder having inlet and outlet terminals adapted to be connected with the passageways of a fluid pressure line, a floating piston within said cylinder intermediate said inlet and outlet passageways, means on said piston for sealing said outlet passageway in the event of a pressure drop through leakage in the outlet pressure line, means for normally maintaining said piston in non-sealing relation to said outlet passageway, an extension housing on said cylinder communicating with said cylinder at a point intermediate the operative path of travel of said piston, a locking pin mounted for straight-line locking movement in said housing and normally bearing in pressure relation against said piston, and means on said piston for locking engagement with said locking pin when the piston has traveled in valve sealing relation to the outlet passageway.

2. A safety device for fluid pressure systems comprising a cylinder having inlet and outlet terminals adapted to be connected with the passageways of a fluid pressure line, a by-pass channel in said cylinder extending longitudinally to a point spaced from the outlet end thereof, a piston adapted to move longitudinally of said cylinder and cut off said by-pass channel as it moves toward the outlet end of said cylinder, an extension housing on said cylinder communicating with said cylinder at a point intermediate the operative path of travel and normally sealed by said piston, a locking pin mounted for straight-line movement in said housing and normally bearing in pressure relation against said piston, and means on said piston for locking engagement with said locking pin when the piston has traveled in valve sealing relation to the outlet passageway.

NORMAN H. RAHE.